(12) United States Patent
Suzuki et al.

(10) Patent No.: US 9,215,048 B2
(45) Date of Patent: *Dec. 15, 2015

(54) FIXED MULTIPLE ACCESS WIRELESS COMMUNICATION

(71) Applicant: COMMONWEALTH SCIENTIFIC AND INDUSTRIAL RESEARCH ORGANISATION, Campbell (AU)

(72) Inventors: Hajime Suzuki, Epping (AU); Douglas Brian Hayman, Macquarie Park (AU); Joseph Abraham Pathikulangara, Epping (AU); Iain Bruce Collings, Roseville Chase (AU); Zhuo Chen, Chatswood (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,575

(22) Filed: Jan. 24, 2014

(65) Prior Publication Data

US 2014/0140320 A1    May 22, 2014

Related U.S. Application Data

(62) Division of application No. 12/746,911, filed on Aug. 27, 2010, now Pat. No. 8,675,512.

(30) Foreign Application Priority Data

Sep. 2, 2008   (AU) ................................ 2008904556
Aug. 10, 2009  (WO) ................ PCT/AU2009/001022

(51) Int. Cl.
*H04W 72/04*   (2009.01)
*H04W 52/40*   (2009.01)
(Continued)

(52) U.S. Cl.
CPC ............ *H04L 5/0005* (2013.01); *H04B 7/0408* (2013.01); *H04B 7/0617* (2013.01); *H04B 7/08* (2013.01); *H04W 56/006* (2013.01)

(58) Field of Classification Search
USPC .................................. 370/329, 344, 338, 336
See application file for complete search history.

(56) References Cited

U.S. PATENT DOCUMENTS

| 5,818,385 | A | 10/1998 | Bartholomew |
|---|---|---|---|
| 6,128,276 | A | 10/2000 | Agee |

(Continued)

FOREIGN PATENT DOCUMENTS

| WO | 2004/075459 A2 | 9/2004 |
|---|---|---|
| WO | 2007/111941 A2 | 10/2007 |

(Continued)

OTHER PUBLICATIONS

Dulski, Andrei, et al., "Rural WCDMA—Aiming for nationwide coverage with one network, one technology, and one service offering," Ericsson Review No. 2, pp. 79-85 (2006).

Gerlach, Derek, et al., "Adaptive transmitting antenna arrays with feedback," IEEE Signal Processing Letters, vol. 1, No. 10, pp. 150-152, (Oct. 1994).

(Continued)

*Primary Examiner* — Andrew Lee
(74) *Attorney, Agent, or Firm* — Kilpatrick Townsend & Stockton LLP

(57) ABSTRACT

Disclosed is a user terminal for wireless communication with a remote access point, the user terminal comprising: a mapping module adapted to map one or more input data bits to an uplink symbol; a delay module adapted to apply a delay to the uplink symbol; a transmit module adapted to modulate the delayed symbol into a frequency channel; and a directional antenna oriented along a dominant path to the access point, the antenna being adapted to transmit the modulated symbol to the access point, wherein the delay is chosen such that the transmitted symbol arrives at the access point simultaneously with a further symbol modulated into the frequency channel and transmitted by a further user terminal.

4 Claims, 9 Drawing Sheets

(51) Int. Cl.

| | |
|---|---|
| *H04L 5/00* | (2006.01) |
| *H04B 7/04* | (2006.01) |
| *H04B 7/06* | (2006.01) |
| *H04B 7/08* | (2006.01) |
| *H04W 56/00* | (2009.01) |

(56) References Cited

U.S. PATENT DOCUMENTS

| | | |
|---|---|---|
| 6,219,341 B1 | 4/2001 | Varanasi |
| 6,512,737 B1 | 1/2003 | Agee |
| 6,934,511 B1 | 8/2005 | Lovinggood et al. |
| 7,039,441 B1 | 5/2006 | Reudink et al. |
| 7,079,480 B2 | 7/2006 | Agee |
| 7,088,671 B1 | 8/2006 | Monsen |
| 7,110,349 B2 | 9/2006 | Branlund et al. |
| 7,120,132 B2 | 10/2006 | Choi et al. |
| 7,142,864 B2 | 11/2006 | Laroia et al. |
| 7,221,699 B1 | 5/2007 | Lindskog |
| 7,248,841 B2 | 7/2007 | Agee et al. |
| 8,675,512 B2 * | 3/2014 | Suzuki et al. ............... 370/252 |
| 2002/0032031 A1 | 3/2002 | Ogino et al. |
| 2004/0063438 A1* | 4/2004 | Hsu et al. ................. 455/452.1 |
| 2005/0245264 A1 | 11/2005 | Laroia et al. |
| 2007/0021121 A1 | 1/2007 | Lane et al. |
| 2007/0202903 A1 | 8/2007 | Ge et al. |
| 2008/0013521 A1 | 1/2008 | Rangan et al. |
| 2008/0192856 A1* | 8/2008 | Jongren et al. ............... 375/267 |
| 2008/0212702 A1* | 9/2008 | Pan et al. ..................... 375/260 |
| 2008/0240003 A1 | 10/2008 | Brunel et al. |
| 2009/0316627 A1 | 12/2009 | Fonseka et al. |
| 2010/0086071 A1 | 4/2010 | Umehara |
| 2010/0130220 A1 | 5/2010 | Laroia et al. |
| 2011/0075639 A1 | 3/2011 | Rangan et al. |
| 2011/0228879 A1 | 9/2011 | Lopez et al. |
| 2011/0312317 A1 | 12/2011 | Sahin et al. |

FOREIGN PATENT DOCUMENTS

| | | |
|---|---|---|
| WO | 2007/148458 A1 | 12/2007 |
| WO | 2009/002248 A1 | 12/2008 |
| WO | 2009/011756 A1 | 1/2009 |
| WO | 2010/021904 A1 | 2/2010 |
| WO | 2010/022091 A1 | 2/2010 |
| WO | 2010/022150 A1 | 2/2010 |
| WO | 2010/022253 A1 | 2/2010 |

OTHER PUBLICATIONS

Peel, Christian B., et al., "A vector-perturbation technique for near-capacity multiantenna multiuser communication—Part I: Channel inversion and regularization," *IEEE Transactions on Communications*, vol. 53, No. 1, pp. 195-202, (Jan. 2005).

Hochwald, Bertrand, M., et al., "A vector-perturbation technique for near-capacity multiantenna multiuser communication—Part II: Perturbation," *IEEE Transactions on Communications*, vol. 53, No. 3, pp. 537-544, (Mar. 2005).

Hochwald, Bertrand, M., et al., "Achieving near-capacity on a multiple-antenna channel," *IEEE Transactions on Communication*, vol. 53, No. 3, pp. 389-399, (Mar. 2003).

Suzuki, Hajime, et al., "Design criteria of MIMO systems," *In Proceedings of the IEEE Vehicular Technology Conference*, vol. 4, pp. 1840-1843, (May 2006).

McKay, Matthew R., et al., "Capacity and performance of MIMO-BICM with zero-forcing receivers," IEEE Transactions on Communications, vol. 53, No. 1, pp. 74-83, (Jan. 2005).

Spencer, Quentin H., et al., "Zero-forcing methods for downlink spatial multiplexing in multiuser MIMO channels," *IEEE Transactions on Signal Processing*, vol. 52, No. 2, pp. 461-471, (Feb. 2004).

Jiang, Ming, et al., "Multiuser MIMO-OFDM for next-generation wireless systems," *Proceedings of the IEEE*, vol. 95, No. 7, pp. 1430-1469, (Jul. 2007).

Winters, Jack H., "Smart antennas for wireless systems," *IEEE Personal Communications*, vol. 5, No. 1, pp. 23-27, (Feb. 1998).

Goldsmith, Andrea, et al., "Capacity limits of MIMO channels," *IEEE Journal on Selected Areas in Communications*, vol. 21, No. 5, pp. 684-702, (Jun. 2003).

Gesbert, David, et al., "From theory to practice: An overview of MIMO space-time coded wireless systems," *IEEE Journal on Selected Areas in Communications*, vol. 21, No. 3, pp. 281-302, (Apr. 2003).

Stueber, Gordon L., "Broadband MIMO-OFDM wireless communications," *Proceedings of the IEEE*, vol. 92, No. 2, pp. 271-294, (Feb. 2004).

Paulraj, Arogyaswami, et al., "An overview of MIMO communications—A key to gigabit wireless," *Proceedings of the IEEE*, vol. 92, No. 2, pp. 198-218, (Feb. 2004).

European Search Report mailed Dec. 21, 2012 in Application No. 09810903.6.

Hsiao-Hwa, Chen et al. Isotropic air-interface in TD-SCDMA: uplink synchronization control and its environment-dependent performance analysis, Vehicular Technology Conference, 2003. VTC 2003—FALL. 2003 IEEE 58th Orlando, FL US Oct. 6-9, 2003.

\* cited by examiner

FIXED MULTIPLE ACCESS WIRELESS COMMUNICATION

CROSS-REFERENCES TO RELATED APPLICATIONS

This application is a divisional of U.S. patent application Ser. No. 12/746,911, filed Aug. 27, 2010, which is the National Stage of International Application No. PCT/AU2009/001022 filed Aug. 10, 2009, and which claims the benefit of Australian Patent Application No. 2008904556, filed Sep. 2, 2008, the disclosures of which are incorporated herein by reference.

FIELD OF THE INVENTION

The present invention relates generally to wireless communication and, in particular, to wireless communication between sparsely distributed fixed user stations and a fixed access point.

BACKGROUND

Providing an inexpensive high-capacity bidirectional data link to user terminals in remote areas poses many challenges. Because user terminals in remote areas are typically distributed sparsely over a large geographic area (e.g. tens of terminals over hundreds of square kilometers), the cost of deploying a wired network is prohibitive. Wireless communication networks, with a point-to-multipoint topology comprising a network hub or access point with which multiple user terminals communicate independently and bidirectionally, are a more promising technology to deploy.

In digital broadcasting a video stream of 20 MBits/sec can be delivered from an access point to any number of user terminals over a radius of tens of kilometers within a 7 MHz bandwidth in the VHF frequency band. However, in a broadcasting application the data is unidirectional and common to all user terminals, so the required capacity to service all users is independent of the number of user terminals.

Candidate wireless technologies for independent bidirectional data transmission such as WiMAX (IEEE 802.16), which typically operates at a carrier frequency above 2 GHz, suffer from two related problems:
1. Inadequate coverage. The distance between an access point and a user terminal is limited to less than 10 kilometers at a carrier frequency above 2 GHz using an access point antenna height of less than 30 m in a point-to-multipoint topology.
2. Inadequate capacity. Current WiMAX technology typically provides a spectral efficiency of 2 to 5 bits/sec/Hz (i.e. 20 to 50 MBits/sec per 10 MHz frequency channel). This capacity needs to be shared among, potentially, thousands of users. To provide simultaneous access at data rates of 1 to 20 MBits/s to this number of users from a single access point requires a prohibitively large bandwidth at the carrier frequency.

There is a tradeoff between these two problems in that capacity can be sacrificed for coverage, or vice versa, by decreasing or increasing the carrier frequency respectively. A possible way out of the tradeoff is to increase the transmit power from the access point and the user terminals. This however increases the cost of the system.

A satisfactory compromise providing acceptable bidirectional data rates to all users in a sufficiently wide coverage area at low enough power levels to yield acceptable cost is yet to be found with WiMAX or other conventional technologies.

SUMMARY

It is an object of the present invention to substantially overcome, or at least ameliorate, one or more disadvantages of existing arrangements.

Disclosed are arrangements which seek to address the above problems, for example, a wireless communication system in which multiple user terminals are accurately synchronised in time and frequency to allow the parallel uplink data streams from the user terminals to be effectively separated at the access point. Because the system relies predominantly on line-of-sight transmission, the user terminal antennas are directional, saving power on the uplink.

According to a first aspect of the present disclosure, there is provided a user terminal for wireless communication with a remote access point, the user terminal comprising a mapping module adapted to map one or more input data bits to an uplink symbol; a delay module adapted to apply a delay to the uplink symbol; a transmit module adapted to modulate the delayed symbol into a frequency channel; and a directional antenna oriented along a dominant path to the access point, the antenna being adapted to transmit the modulated symbol to the access point, wherein the delay is chosen such that the transmitted symbol arrives at the access point simultaneously with a further symbol modulated into the frequency channel and transmitted by a further user terminal.

According to a second aspect of the present disclosure, there is provided a system for wireless communication comprising an access point adapted to wirelessly communicate data symbols in at least one of two or more different frequency channels, and two or more different time slots of a frequency channel; and a plurality of user terminals, each user terminal being adapted to communicate the data symbols in one time slot of one frequency channel, wherein each user terminal with the same azimuthal ordering modulo the number of different frequency channels or time slots is adapted to communicate the data symbols in the same frequency channel and in the same time slot.

Other aspects are also disclosed.

BRIEF DESCRIPTION OF THE DRAWINGS

One or more embodiments of the present invention will now be described with reference to the drawings, in which.

DETAILED DESCRIPTION

Figure 1A:
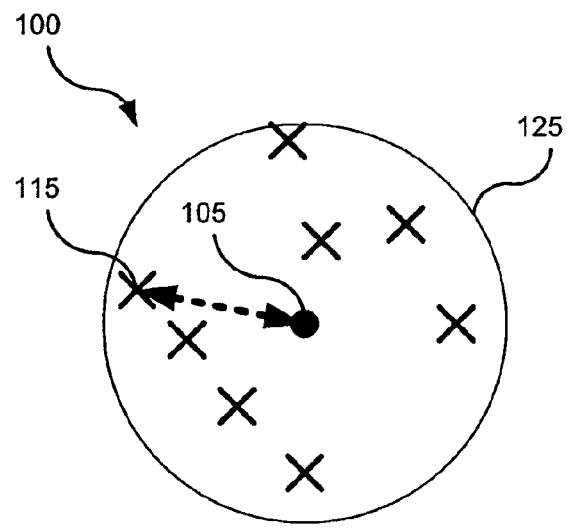
FIG. 1a is an illustration of a wireless communication system in which the embodiments of the present invention may be practised.

Where reference is made in any one or more of the accompanying drawings to steps and/or features, which have the same reference numerals, those steps and/or features have for the purposes of this description the same function(s) or operation(s), unless the contrary intention appears.

FIG. 1a is an illustration of a wireless communication system 100 in which the embodiments of the invention may be practised. The system 100 includes an access point 105 in bidirectional wireless communication in a single time slot of a single frequency channel with M user terminals, e.g. 115, at fixed locations sparsely distributed within a circular area 125, with a typical radius of tens of kilometers. In the illustration M=8, but any value of M is possible up to and including the number N of access point antennas. The access point is 105 typically connected to another network, for example the public-switched telephone network.

Figure 1B:
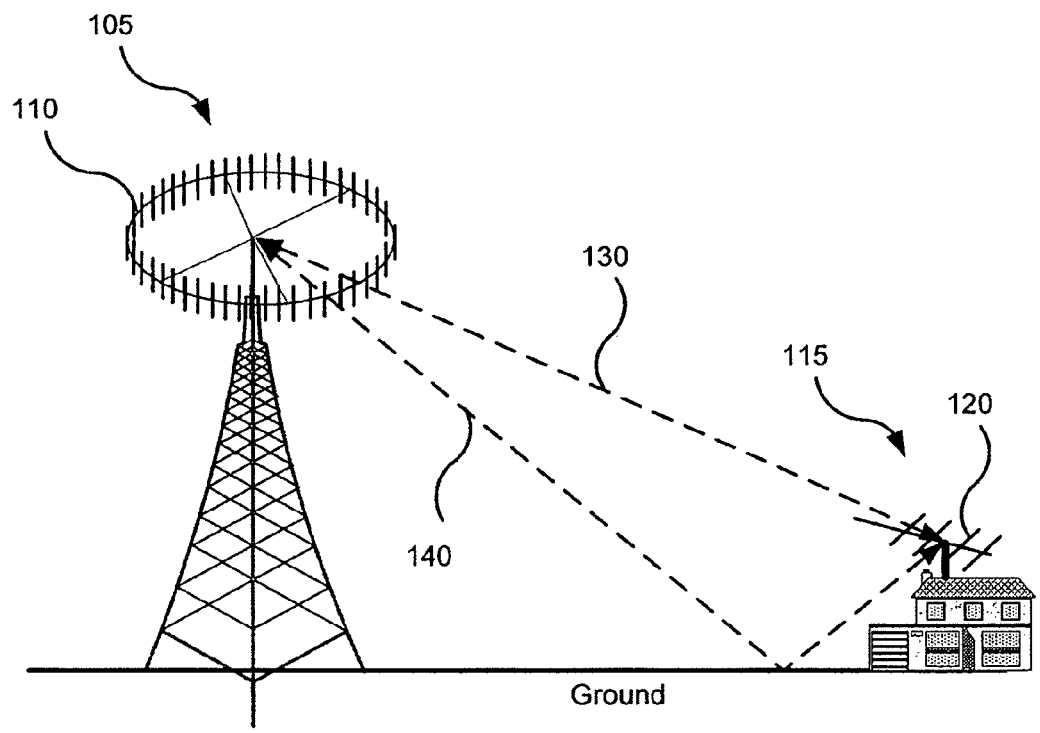
FIG. 1b illustrates, in exaggerated scale, the access point and one of the user terminals of FIG. 1a in more detail.

FIG. 1b illustrates, in exaggerated scale, the access point 105 and one of the user terminals 115 of the system 100 in more detail. The access point 105 includes an array 110 of N vertically polarised antennas uniformly arranged in a horizontal circle, elevated from the ground by mounting on a tower. The antenna array 110 is used for both transmitting and receiving data. The bidirectional communication is performed in a time division duplexing (TDD) manner. The circular array 110 is just one example of an arrangement of antennas at the access point 105; other possible arrangements are linear, square, and arc. The spacing of the antenna array 110 need not be uniform. The performance of the system 100, as described below, improves as the antenna spacing increases as a ratio of the carrier wavelength, but clearly there are practical limits on the spacing. The access point 105 antennas, illustrated as half-wave dipoles, may be of any omni-directional design. Directional antennas can also be used at the access point 105, provided that the number of simultaneous user terminals operating in the same frequency channel within any particular region does not exceed the number of access point directional antennas covering the region. In this case, each region may be treated independently as serviced by a single instance of the system 100.

Also shown in FIG. 1b is a user terminal 115, illustrated as a house with a directional antenna (illustrated as a Yagi antenna) 120 mounted thereon, used for both transmitting and receiving data. In the remote-area environment for which the system 100 is designed, the line-of-sight signal path 130 between the user terminal antenna 120 and the access point array 110 is usually the dominant path, with the only other signal path of significance being a ground reflection path 140. The main beam of the antenna 120 is therefore oriented along the direction of the access point 105. Alternatively, if it is known that at a particular user terminal location, the dominant path to the access point is not line-of-sight (e.g. reflection from a mountain), then the main beam of the user terminal antenna 120 can be oriented along the non-line-of-sight dominant path.

Figure 2:
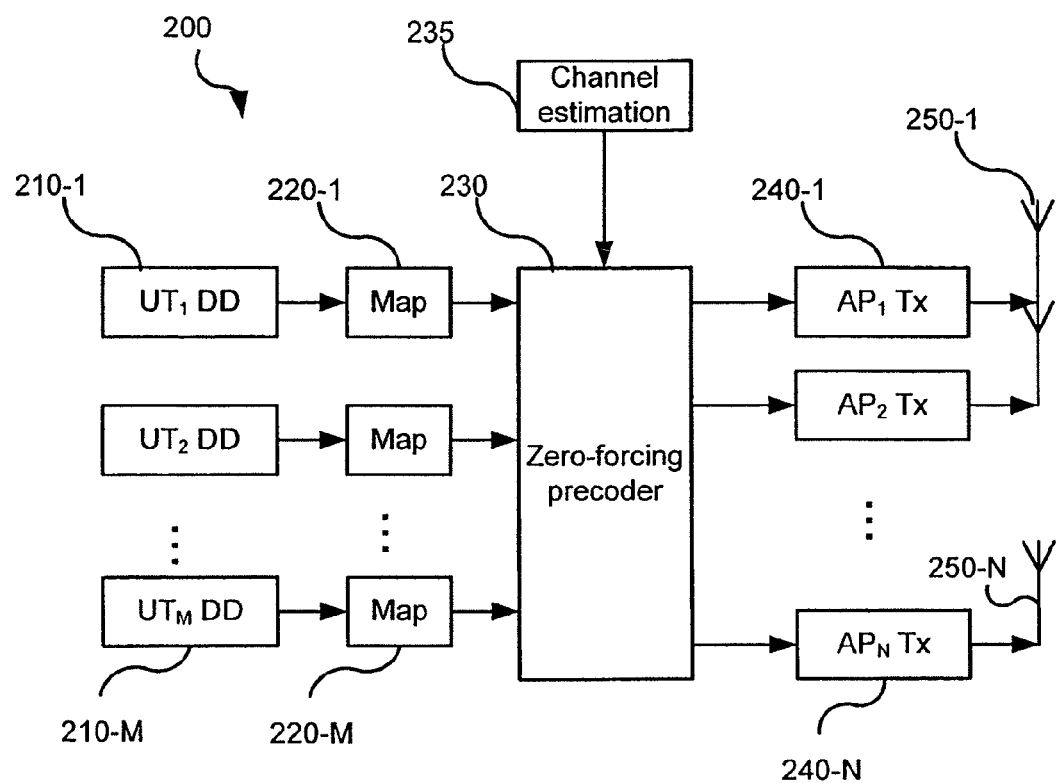
FIG. 2 is a block diagram of the signal processing system for the downlink at the access point of FIG. 1b.

FIG. 2 is a block diagram of the signal processing system 200 for the downlink (i.e. transmission from the access point 105 to the user terminal 115) at the access point 105 of the system 100. Binary downlink data (DD) intended for the m-th user terminal (UT) 115 (m=1, 2, . . . , M), typically obtained from the network to which the access point 105 is connected, is routed through the $UT_m$ DD module 210-$m$. The downlink data is optionally coded by a forward error correction (FEC) encoder (not shown) at the cost of some data redundancy, i.e. a reduced data rate. The binary downlink data is then mapped onto a multi-level quadrature amplitude modulation (M-QAM) or a multi-level phase shift keying (M-PSK) symbol constellation, by the Map module 220-$m$ to produce downlink data symbols $s_{D,m}$ to be transmitted to the m-th user terminal. The M-QAM or M-PSK transmitted symbols are allocated by the Map module 220-$m$ to bit groupings with q bits per symbol.

Channel information, obtained from a channel estimation module 235, is used by a zero-forcing precoder (ZFP) module 230 to perform zero-forcing precoding on the downlink data symbols $s_{D,m}$ as described below. The downlink channel information is obtained from the uplink channel information using the principle of reciprocity as described below. The uplink channel information is estimated by sending training signals from the user terminals to the access point. The training signals are known both to the user terminals and the access point prior to the transmission. The training signal from one user terminal is orthogonal to the training signals from all other user terminals. For example, a training signal is sent from only one user terminal at one time so that the information for the uplink channels from the user terminal antenna to N access point antennas can be estimated without interference from the transmissions of the other users. In other embodiments, the training signals from different users can be made orthogonal in frequency or in code.

The resulting precoded symbols are scaled by a common factor, and the scaled precoded symbols $x_{D,n}$ (n=1, 2, . . . , N) are modulated onto a common carrier in the frequency channel by an access point transmit ($AP_n$ Tx) module 240-$n$ and transmitted via a corresponding transmit antenna 250-$n$ which is part of the access point array 110.

Figure 3:
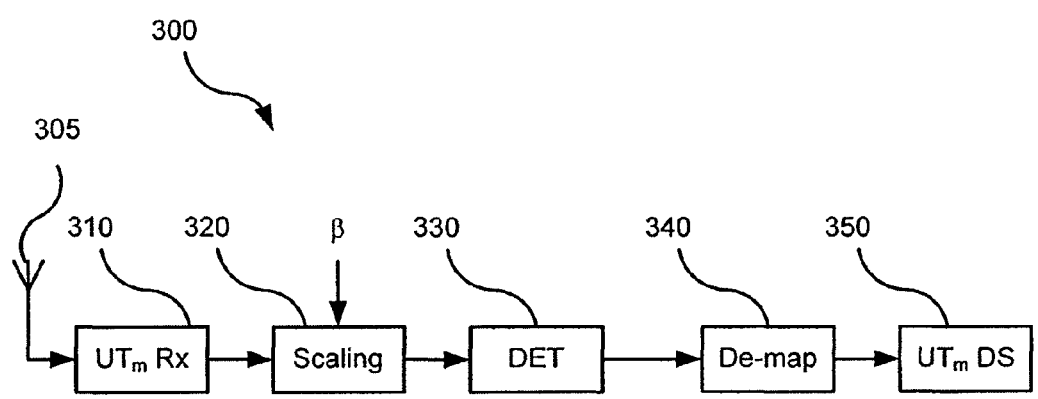
FIG. 3 is a block diagram of the signal processing system for the downlink at the user terminal of FIG. 1b.

FIG. 3 is a block diagram of the signal processing system 300 for the downlink at the m-th user terminal 115 (m=1, 2, . . . , M) of the system 100. The m-th user terminal receive ($UT_m$ Rx) module 310 receives and demodulates symbols $r_{D,m}$ from the antenna 305. Each received symbol $r_{D,m}$ is scaled by a scaling factor β, defined below, at the scaling module 320 to produce scaled symbols $z_{D,m}$. The detection of downlink symbols $s_{D,m}$ from the scaled received symbols $z_{D,m}$ is performed by the DET module 330 as described below. The De-map module 340 performs de-mapping of detected data symbols $\hat{s}_{D,m}$ to binary data according to the symbol constellation used by the map module 220-$m$. The binary downlink data is passed to the data sink ($UT_m$ DS) module 350. In the case of FEC coded transmission, the DET module 330 includes a soft decision estimator, the De-map module 340 includes a bit value probability estimator, and the $UT_m$ DS module 350 includes a FEC decoder (not shown).

The zero-forcing precoding allows the downlink portion of the system 100 to function like an SDMA (space-division-multiple-access) system whereby symbols sharing a single timeslot and a single frequency are transmitted to be received by corresponding user terminals at different locations.

Figure 4:
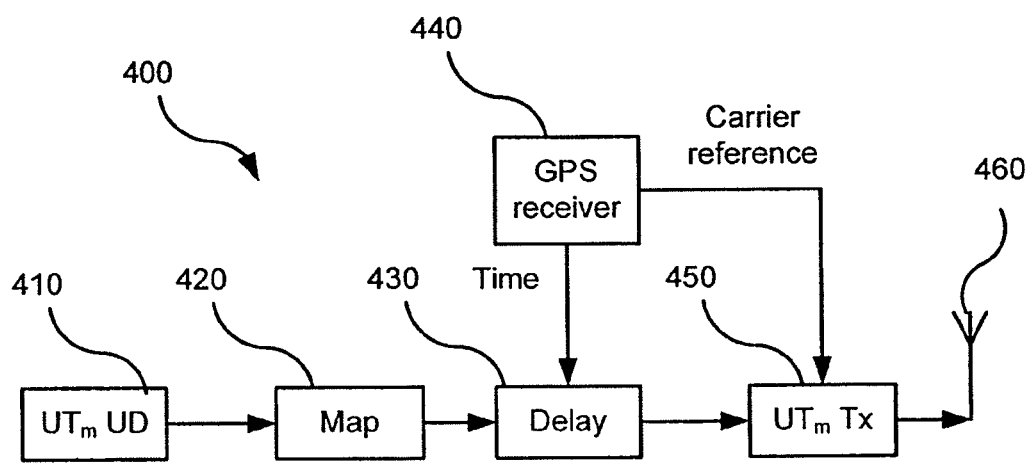
FIG. 4 is a block diagram of the signal processing system for the uplink at the user terminal of FIG. 1b.

FIG. 4 is a block diagram of the signal processing system 400 for the uplink (transmission from the user terminal 115 to the access point 105) at the m-th user terminal 115 (m=1, 2, . . . , M) of the system 100. The bidirectional communication is performed in a TDD manner. Input binary uplink data (UD) from the m-th user terminal is generated in the $UT_m$ UD module 410. The uplink data from the $UT_m$ UD module 410 is optionally coded by an FEC encoder (not shown). The binary uplink data from the $UT_m$ UD module 410 is then mapped by the Map module 420 onto a M-QAM or M-PSK symbol constellation to produce uplink data symbols $s_{U,m}$. The time information from a Global Positioning System (GPS)

receiver 440 is used by the Delay module 430 to synchronise the transmission of symbols from the user terminal 115 with the other user terminals. A commercially available GPS module that is capable of providing a timing accuracy of less than 15 ns and a frequency accuracy of less than 30 parts per billion (ppb) can be used for this purpose. The accurate time information available from the public data of the GPS allows user terminals to synchronise their transmission to within 15 ns, which is effectively simultaneous for equalisation purposes at the frequency channels in use. The function of the delay module 430 is to ensure that the transmitted symbols from all the user terminals are simultaneously (to symbol precision) received at the access point 105 regardless of the location of the user terminals. The propagation delay due to the distance from the access point 105 is determined, for example, from the location of the user terminal 115 given by the GPS receiver 440, or from the time of arrival computed with reference to the time information provided by the GPS receiver 440 of an accurate time signal sent from the access point 105 to the user terminal 115. The propagation delay is taken into account by the Delay module 430 to compute the delay that is applied by the Delay module 430.

Figure 9:
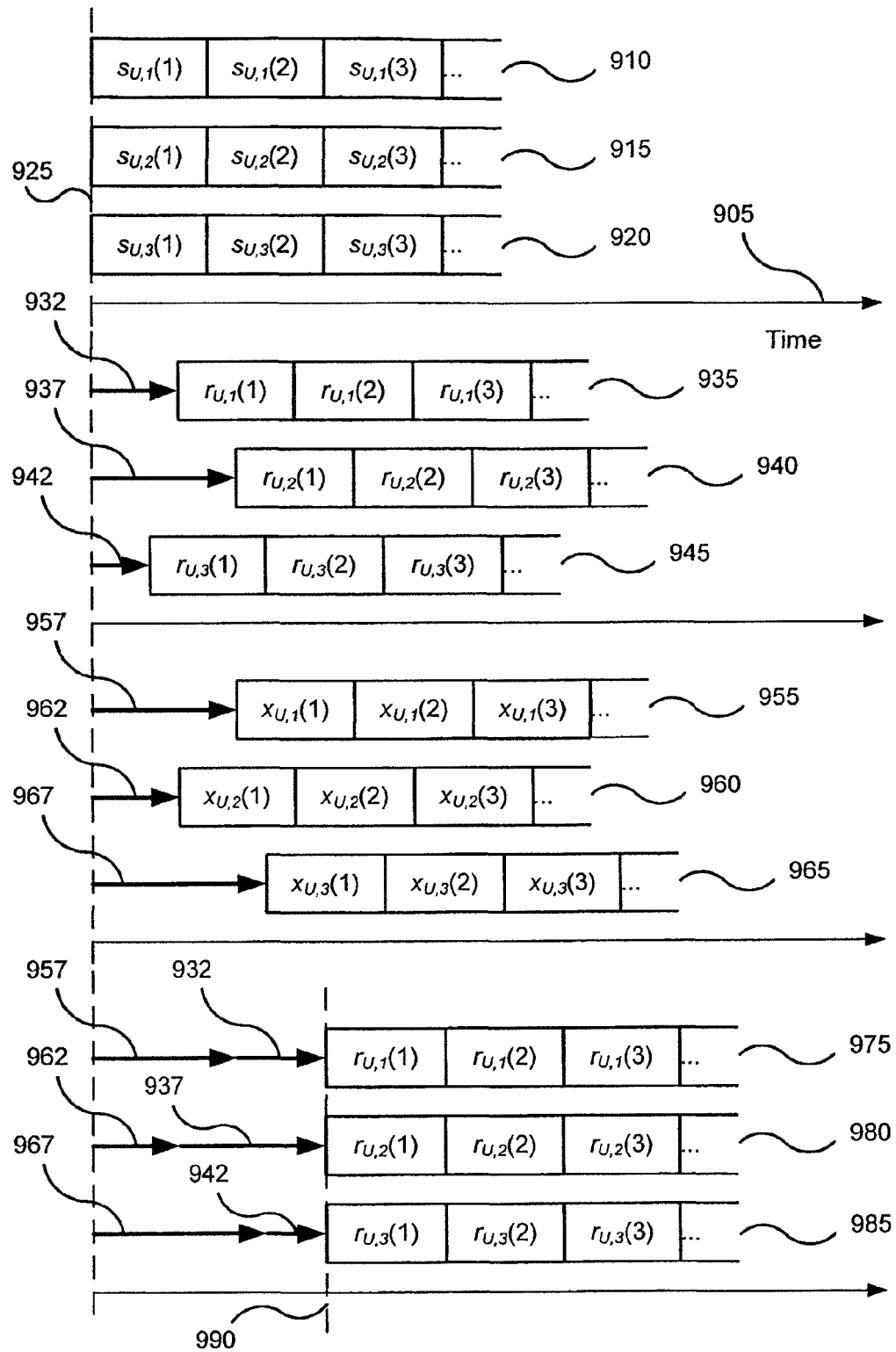
FIG. 9 illustrates the operation of the Delay module in the user terminal uplink system of FIG. 4.

The operation of the delay module 430 is described with reference to FIG. 9. Three sequences 910, 915, and 920 of uplink data symbols $s_{U,m}(i)$ from three user terminals (m=1, 2, 3) are shown against the time axis 905, starting from the instant 925 representing the beginning of the user terminals' time frame with reference to their respective GPS time information. If no delay is applied by Delay module 430, the symbol sequences 910, 915, and 920 become receive symbol sequences $r_{U,n}(i)$ 935, 940, and 945 on arrival at the access point antennas (n=1, 2, 3). Because the user terminals are at different distances from the access point, each received symbol sequence is delayed by a respective propagation delay 932, 937, or 942, and are therefore no longer synchronised with each other. If however each Delay module 430 applies a delay 957, 962, or 967 that is complementary to the corresponding propagation delay 932, 937, or 942 to form a delayed uplink symbol sequence $x_{U,m}(i)$ 955, 960, or 965 respectively, the combination of the applied delays and the propagation delays results in received symbol sequences $r_{U,n}(i)$ 975, 980, and 985 that are synchronised at the access point at the instant 990.

A conventional SDMA access point needs to perform symbol synchronisation (which determines the beginning of each symbol) and carrier offset correction (which determines the difference in frequency between the frequency reference used in a user terminal and the frequency reference used at the access point) for each user terminal. By taking into account the propagation delay at the transmission from the user terminals, and thereby synchronising the reception at the access point to symbol precision, the access point needs to perform symbol synchronisation only once for all user terminals. Similarly, by using the same frequency reference obtained from the GPS signal at every user terminal, the access point needs to perform carrier offset correction only once for all user terminals. If the access point also uses the same frequency reference obtained from the GPS signal, then no carrier offset correction is required. The effects of Doppler shift are small due to the existence of dominant line-of-sight path and the fixed access point and user terminals. This greatly simplifies the signal processing required to detect symbols from each user terminal received at the same time slot in the same frequency channel. Notably, conventional MIMO signal processing techniques, such as V-BLAST, can then be used within the system 100.

The delay module 430 also scales each uplink data symbol $s_{U,m}$ as described below. The scaled, delayed uplink symbol $x_{U,m}$ is modulated onto a common carrier in the frequency channel by the user terminal transmit ($UT_m$ Tx) module 450 and transmitted by the antenna 460. The directional nature of the antenna 460 (typically with an antenna gain of 10 to 20 dBi) enables the transmitted power for the uplink to be much lower than would be required if the antenna 460 were omnidirectional to provide the same SNR at the access point 105.

The carrier frequency reference for the $UT_m$ Tx module 450 is given by the GPS receiver 440, so that the frequency reference of each user terminal 115 is synchronised with the access point 105 to an accuracy of, for example, 30 parts per billion. The time and frequency synchronisation of the multiple user terminals, together with the multiple antennas at the access point 105, gives the system 100 the characteristics of a multiple-input multiple-output (MIMO) system, which is normally employed to increase the capacity of a link between two terminals in conditions of severe multipath propagation. By contrast with the system herein disclosed, conventional MIMO systems utilise omni-directional antennas at both terminals to maximise the diversity order of the multipath channel.

Figure 5:
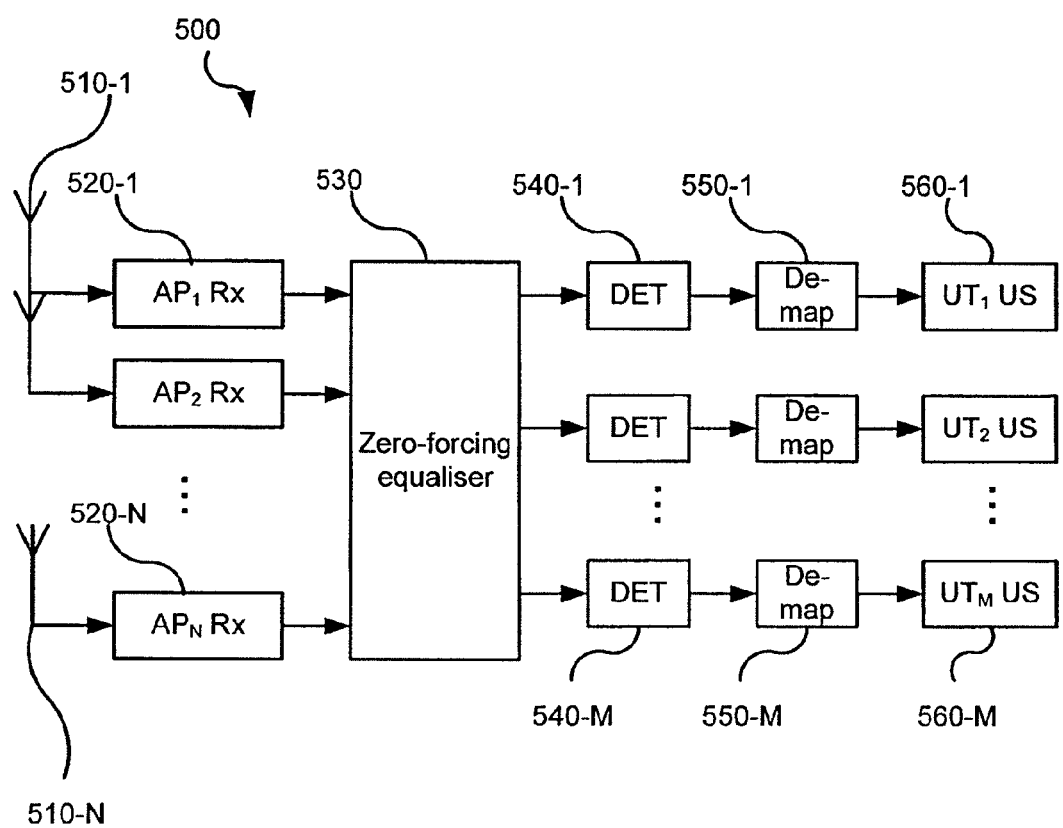
FIG. 5 is a block diagram of the signal processing system for the uplink at the access point of FIG. 1b.

FIG. 5 is a block diagram of the signal processing system 500 for the uplink at the access point 105 of the system 100. The n-th (n=1, 2, . . . , N) access point receive ($AP_n$ Rx) module 520-$n$ receives a signal from a corresponding antenna 510-$n$ and demodulates symbols $r_{U,n}$ from the received signal. Zero-forcing equalisation is performed by the module 530 as described below to produce equalised symbols $z_{U,m}$ (m=1, 2, . . . , M). The detection of transmitted symbols $s_{U,m}$ from the equalised symbols $z_{U,m}$ is performed by the DET module 540-$m$ as described below. The De-map module 550-$m$ performs de-mapping of detected data symbols $\hat{s}_{U,m}$ to binary uplink data, which is passed onto the m-th user terminal uplink data sink ($UT_m$ US) module 560-$m$. In the case of FEC coded transmission, the DET module 540-$m$ includes soft decision estimation, the De-map module 550-$m$ includes bit value probability estimation, and the $UT_m$ US module 560-$m$ includes a FEC decoder (not shown).

The downlink channel, through which downlink transmit symbols $x_{D,n}$ from the n-th access point transmitter 240-$n$ become received symbols $r_{a,m}$ at the m-th user terminal receive module 310, is modelled as a matrix multiplication:

$$\begin{bmatrix} r_{D,1} \\ r_{D,2} \\ \vdots \\ r_{D,M} \end{bmatrix} = \begin{bmatrix} g_{D,1,1} & g_{D,1,2} & \cdots & g_{D,1,N} \\ g_{D,2,1} & g_{D,2,2} & & g_{D,2,N} \\ \vdots & & \ddots & \vdots \\ g_{D,M,1} & g_{D,M,2} & \cdots & g_{D,M,N} \end{bmatrix} \begin{bmatrix} x_{D,1} \\ x_{D,2} \\ \vdots \\ x_{D,N} \end{bmatrix} + \begin{bmatrix} n_{D,1} \\ n_{D,2} \\ \vdots \\ n_{D,M} \end{bmatrix} \quad (1)$$

where $g_{D,m,n}$ is the complex-valued (m, n)-th element of the downlink channel matrix $G_D$ (M rows by N columns), and $n_{D,m}$ is the additive noise at the m-th user terminal receive module 310.

Equation (1) may be rewritten as $$r_D = G_D \times x_D + n_D \quad (2)$$

Define a pseudo-inverse, $W_D$, of $G_D$ as follows:

$$W_D = (G_D^H G_D)^{-1} G_D^H \quad (3)$$

where H indicates the Hermitian (complex conjugate transpose) of a matrix.

$W_D$ is a N×M matrix enumerated as $$W_D = \begin{bmatrix} w_{D,1,1} & w_{D,1,2} & \cdots & w_{D,1,M} \\ w_{D,2,1} & w_{D,2,2} & & w_{D,2,M} \\ \vdots & & \ddots & \vdots \\ w_{D,N,1} & w_{D,N,2} & \cdots & w_{D,N,M} \end{bmatrix} \quad (4)$$

that satisfies $$W_D G_D = I_N$$

The zero-forcing pre-coding carried out at the access point 105 by the module 230 is defined as follows:

$$x_D = \sqrt{\frac{NP_D}{\|W_D\|^2}} W_D s_D \quad (5)$$

where $$s_D = \begin{bmatrix} s_{D,1} \\ s_{D,2} \\ \vdots \\ s_{D,M} \end{bmatrix} \quad (6)$$

is the vector of user terminal downlink symbols, $P_D$ is a time-averaged transmitting power from an access point transmit antenna 250-$n$, and $$\|W_D\|^2 = \sum_{n=1}^{N} \sum_{m=1}^{M} |w_{D,n,m}|^2 \quad (7)$$

The scaling by $\sqrt{NP_D/\|W_D\|^2}$ if makes sure that the total transmitting power from the access point transmitters 240-$n$ is constrained to $NP_D$.

Substituting (5) into (2) gives $$r_D = \sqrt{\frac{NP_D}{\|W_D\|^2}} G_D W_D s_D + n_D \quad (8)$$

$$= \sqrt{\frac{NP_D}{\|W_D\|^2}} s_D + n_D$$

The scaling factor $\beta$ used by the scaling module 320 at each user terminal before detection of downlink symbols is defined as $\sqrt{\|W_D\|^2/(NP_D)}$, so that:

$$z_D = \sqrt{\frac{\|W_D\|^2}{NP_D}} r_D = s_D + \sqrt{\frac{\|W_D\|^2}{NP_D}} n_D \quad (9)$$

or, at the user terminal m, $$z_{D,m} = s_{D,m} + \sqrt{\frac{\|W_D\|^2}{NP_D}} n_{D,m} \quad (10)$$

The value of $\beta$ is provided at each user terminal 115 prior to the reception of data symbols. This can be achieved, for example, by sending a known reference signal from the access point 105. While an accurate value of $\beta$ at the user terminal 115 improves the accuracy of the de-mapping, the scaling factor $\beta$ can also be estimated at the user terminal 115 from, for example, the variance of the received symbols, provided that the variance of the noise component is smaller than that of the signal component.

The detection of transmitted symbols is performed by the DET module 330 as a "hard decision":

$$\hat{s}_{D,m} = \underset{s_i \in Q}{\operatorname{argmin}} |z_{D,m} - s_i| \quad (11)$$

where $s_i$, i=1, 2, ..., $2^q$, is the i-th symbol in the chosen M-QAM or M-PSK constellation Q.

Like the downlink channel, the uplink channel is modelled as a matrix multiplication:

$$\begin{bmatrix} r_{U,1} \\ r_{U,2} \\ \vdots \\ r_{U,N} \end{bmatrix} = \begin{bmatrix} g_{U,1,1} & g_{U,1,2} & \cdots & g_{U,1,N} \\ g_{U,2,1} & g_{U,2,2} & & g_{U,2,N} \\ \vdots & & \ddots & \vdots \\ g_{U,N,1} & g_{U,N,2} & \cdots & g_{U,N,M} \end{bmatrix} \begin{bmatrix} x_{U,1} \\ x_{U,2} \\ \vdots \\ x_{U,M} \end{bmatrix} + \begin{bmatrix} n_{U,1} \\ n_{U,2} \\ \vdots \\ n_{U,N} \end{bmatrix} \quad (12)$$

where $r_{U,n}$ and $n_{U,n}$ are the received uplink symbol and the noise respectively at the n-th access point receive module 520-$n$, $x_{U,m}$ is the transmitted uplink symbol from the m-th user terminal transmit module 450, and $g_{U,n,m}$ is the complex-valued uplink channel coefficient between the m-th user terminal transmit module 450 and the n-th access point receive module 520-$n$.

Equation (12) may be rewritten in matrix form as $$r_U = G_U x_U + n_U \quad (13)$$

where $G_U$ is the N by M matrix whose (n, m)-th entry is $g_{U,n,m}$.

Since the same frequency channel is used for the downlink and the uplink, the reciprocity principle states that $g_{D,m,n} = g_{U,n,m}$, or $$G_D = G_U^T \quad (14)$$

where the superscript T indicates the transpose of a matrix. Write $$s_U = \begin{bmatrix} s_{U,1} \\ s_{U,2} \\ \vdots \\ s_{U,M} \end{bmatrix} \quad (15)$$

where $s_{U,m}$ is a M-QAM or M-PSK uplink data symbol from the user terminal uplink mapping module 420. Then the scaling at the delay module 430 of the user terminal 115 is $$x_{U,m} = \sqrt{P_U} s_{U,m} \quad (16)$$

where $P_U$ is the time-averaged transmit power of each user terminal antenna 460. (The transmit power from each user terminal transmit antenna 120 is the same.) Like the scaling in the module 320, the scaling by $\sqrt{P_U}$ makes sure that the transmitting power from the user terminal transmit antenna 460 is constrained to $P_U$.

Define a pseudo inverse, $W_U$, of $G_U$ as $$W_U = (G_U^H G_U)^{-1} G_U^H \quad (17)$$

$W_U$ is a M×N matrix that satisfies $$W_U G_U = I_M \quad (18)$$

Note that, because of equations (3) and (14), $$W_U{}^T = W_D \quad (19)$$

The zero-forcing equalisation performed by the module 530 of the access point 105 is defined using the uplink channel pseudo-inverse matrix $W_U$ as follows:

$$z_U = \frac{1}{\sqrt{P_U}} W_U r_U \quad (20)$$
$$= \frac{1}{\sqrt{P_U}} W_U G_U x_U + \frac{1}{\sqrt{P_U}} W_U n_U$$
$$= s_U + \frac{1}{\sqrt{P_U}} W_U n_U$$

or $$z_{U,m} = s_{U,m} + \frac{1}{\sqrt{P_U}} \sum_{n=1}^{N} w_{U,m,n} n_{U,n} \quad (21)$$

The values of $W_U/\sqrt{P_U}$ are provided to the access point uplink equaliser 530 prior to the reception of data symbols. This can be achieved, for example, by sending known reference signals from each user terminal to the access point 105.

The detection of uplink data symbols from the m-th user terminal is performed by the Det module 540-m as a "hard decision":

$$\hat{s}_{U,m} = \underset{s_i \in Q}{\operatorname{argmin}} |z_{U,m} - s_i| \quad (22)$$

where $s_i$, i=1, 2, ..., $2^q$, is the i-th symbol in the chosen M-QAM or M-PSK constellation Q.

Alternatives to zero-forcing pre-coding such as regularised inverse pre-coding and vector perturbation can be used at the module 230 of the access point 105. Similarly, for the uplink transmission, conventional spatial multiplexing MIMO equalisation techniques, such as list sphere detection and V-BLAST, can be used as alternatives to zero-forcing equalisation at the module 530 of the access point 105. Also, wideband modulation by conventional techniques such as orthogonal frequency division multiplexing (OFDM) is an alternative to single frequency carrier modulation at the transmit modules 240-n and 450.

The capacity of each link in bits/s/Hz is directly proportional to the value of M, subject to the requirement that M≤N, as long as the bit error rate (BER) is very small. However, as M approaches N, the BER increases. Other factors that adversely affect the BER are:

Lower signal-to-noise ratio (SNR) at the user terminal (downlink) and at the access point (uplink);
Denser symbol constellation (i.e. larger value of q);
Smaller separation of the antennas in the access point antenna array 110;
Greater distance between the access point 105 and the user terminals 115;
Smaller angular separation between the user terminals 115.

Using FEC encoding as described above, erroneous bits can be corrected at the cost of redundancy, so a rise in BER translates to a fall in error-free data rate.

A practical upper limit on M, given other system parameters (e.g. maximum distance of 60 km, a carrier frequency of 600 MHz, a 16-point QAM symbol constellation, a spectral efficiency of 2M bits/sec/Hz, an uncoded BER of 1%, and an SNR of up to 100 dB) is roughly N/2, while the separation between antennas in the access point array 110 should be at least half the wavelength of the carrier.

To increase the number M of user terminals served by a particular access point beyond the practical limit, additional frequency channels may be allocated. For example, 10 frequency channels can be utilised by one access point with 100 antennas to serve 500 user terminals simultaneously, where each of 10 frequency channels serves one group of 50 user terminals. Alternatively, the capacity of one frequency channel may be shared between multiple user groups by assigning the groups to different time slots. With 10 time slots, 500 user terminals can be served within one frequency channel, where each user terminal obtains one tenth of the original data rate. In these cases, assuming predominantly line-of-sight propagation, there is a choice in how the 500 sparsely distributed user terminals are grouped into 10 groups.

Figure 6:
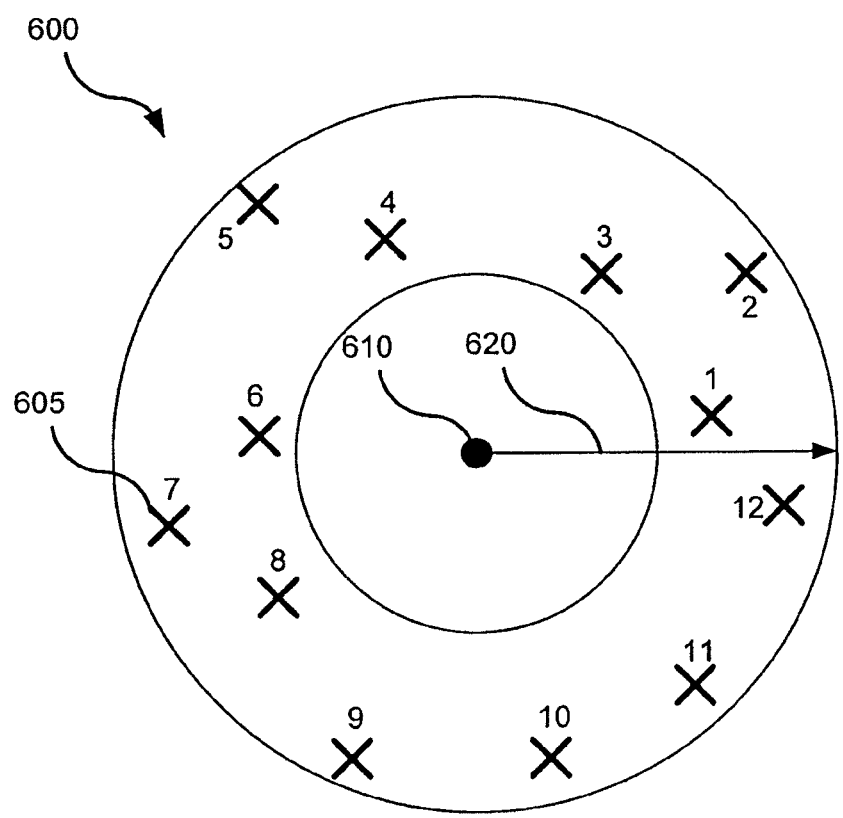
FIG. 6 illustrates a network with 12 user terminals sparsely distributed around an access point within an annular region bounded by two concentric circles.

FIG. 6 illustrates a network 600 with 12 user terminals, e.g. 605, sparsely distributed around an access point 610 within an annular region bounded by two concentric circles marking a minimum and a maximum range. The user terminals are ordered from 1 to 12 by azimuth from a reference direction 620, as shown in FIG. 6. As mentioned above, transmitting independent data to two different user terminals is more error-prone when the two user terminals are located with a small angular (azimuthal) separation, for example the user terminals 4 and 5. This effect can be minimised by assigning user terminals with small azimuthal separation into different groups. In the network 600, the 12 user terminals would be grouped into two groups as follows: Group 1 consists of user terminals {1, 3, 5, 7, 9, 11} and Group 2 consists of user terminals {2, 4, 6, 8, 10, 12}. This grouping paradigm maximises the minimum azimuthal separation between each pair of user terminals that are adjacent in order of azimuth within a group.

More generally, the user terminal indices (after ordering user terminals by azimuth) making up the k-th group out of K groups, given a total number of user terminals KM, are $$\{k+(l-1)K, l=1, 2, \ldots, M\}.$$

i.e. Group k comprises those user terminals whose azimuthal ordering index is equal to k modulo K. In this grouping paradigm, the required SNR to achieve the same BER performance is the same for both groups. In other words, the error-free data rates achievable at the same SNR are the same for both groups.

In a system with both multiple time slots and multiple frequency channels available, the grouping may be dynamic, because not all user terminals wish to send or receive data at every time slot. In this embodiment, for each time slot, the user terminals wishing to send or receive data will be grouped by azimuth among the frequency channels. This further increases the average azimuthal separation between user terminals in the same group.

An alternative to grouping user terminals so as to provide the same performance (BER vs SNR) among all user terminals is to group user terminals to provide differentiated performance. Grouping in this paradigm can be based on distance from the access point, propagation path loss, or received power at the user terminal.

Figure 7:
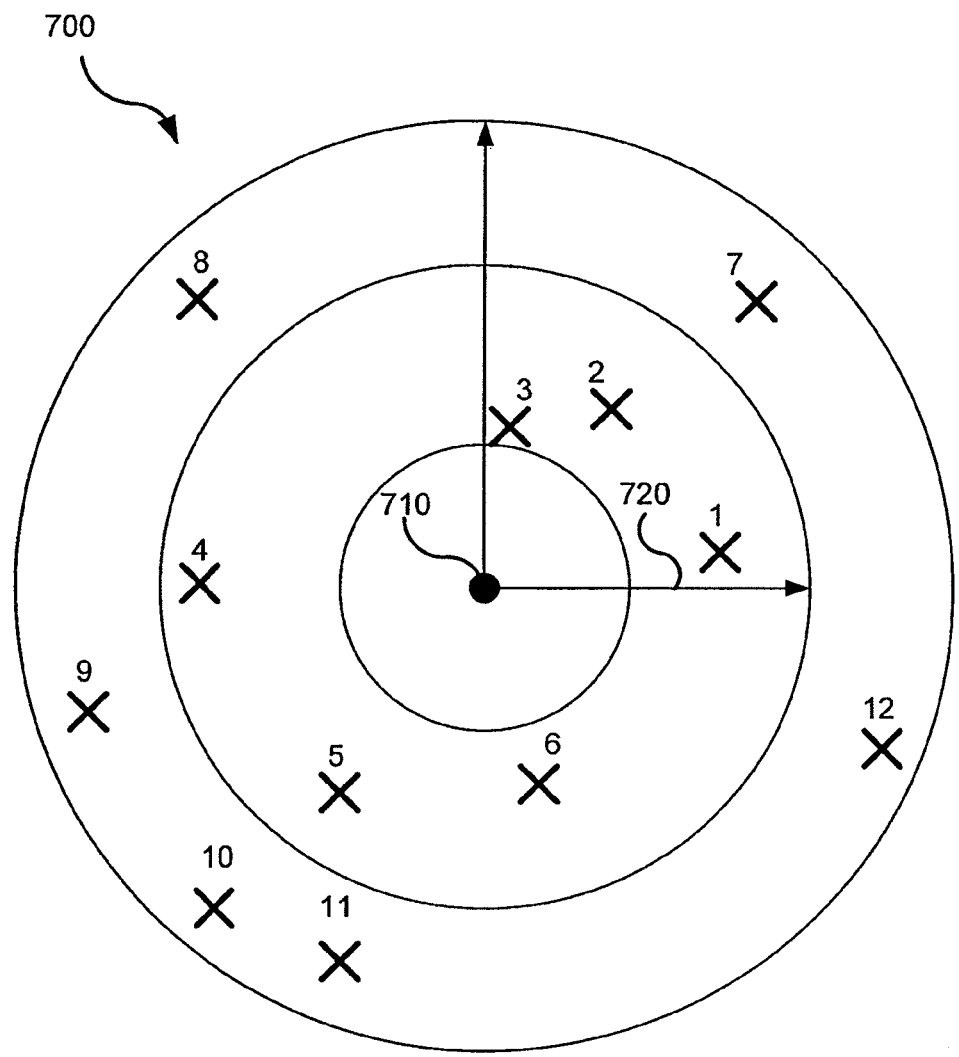
FIG. 7 shows an example of grouping user terminals to provide differentiated data rates.

FIG. 7 shows an example 700 of grouping user terminals to provide differentiated data rates. In the first time slot (or the first frequency channel), users 1 to 6, closer to the access point 710 than a threshold distance 720, are grouped together. In the second time slot (or the second frequency channel), users 7 to 12, further away from the access point 710 than the threshold distance 720, are grouped together. In this grouping paradigm, the required SNR to achieve the same BER performance is smaller for the first group than for the second group. In other words, the error-free data rates achievable at the same SNR are higher for the first group than for the second group.

Figure 8:
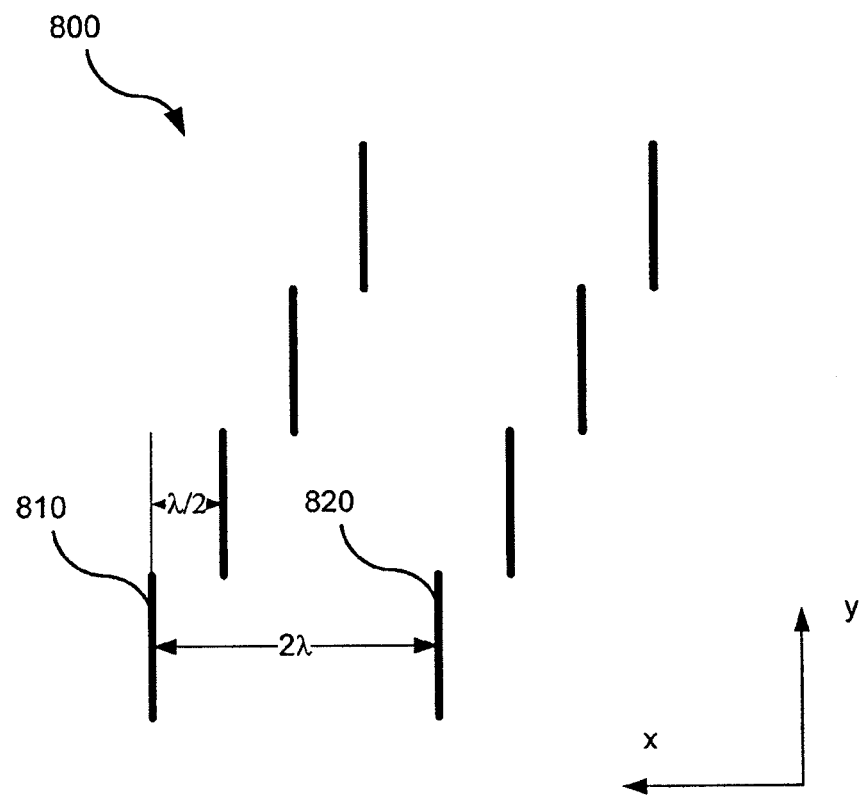
FIG. 8 shows an example of an arrangement of access point antennas to reduce mutual coupling.

With half-wavelength spacing of the antennas in the access point array 110 as described above, the effect of mutual coupling between antennas may significantly reduce the performance. The effect of mutual coupling can be reduced if the access point antennas are displaced vertically. FIG. 8 shows an example of such an arrangement 800 of the access point antennas, e.g. 810, to reduce mutual coupling. In the arrangement 800, adjacent vertically polarised antenna elements 810 are still separated by half a wavelength horizontally, but they are also displaced vertically by their length, to reduce mutual coupling. The vertical displacement is cyclical with a period of four antennas. The nearest horizontally collocated antennas, 810 and 820, are separated by two wavelengths, in which case the effect of mutual coupling is insignificant. The spacing of horizontally collocated antennas can be increased by increasing the period of the cyclical vertical displacement.

Each module of FIGS. 2 to 5 is preferably implemented in dedicated hardware such as one or more integrated circuits performing the functions or sub-functions of the module as described above. Such dedicated hardware may include graphic processors, digital signal processors, or one or more microprocessors and associated memories.

It is apparent from the above that the arrangements described are applicable to the wireless communication industry.

The foregoing describes only some embodiments of the present invention, and modifications and/or changes can be made thereto without departing from the scope and spirit of the invention, the embodiments being illustrative and not restrictive.

The invention claimed is:

1. A system for wireless communication comprising:
an access point adapted to wirelessly communicate data symbols in at least one of:
two or more different frequency channels, and
two or more different time slots of a frequency channel; and
a plurality of user terminals, each said user terminal being adapted to communicate said data symbols in one said time slot of one said frequency channel,
wherein each user terminal with the same azimuthal ordering modulo or the number of said different frequency channels or time slots is adapted to communicate said data symbols in the same said frequency channel and in the same said time slot.

2. The system of claim 1, wherein said access point further comprises a precoding module adapted to precode said data symbols before transmitting, said precoding being dependent on information about at least one said frequency channel between said access point and said user terminals.

3. The system of claim 1, wherein said access point further comprises a plurality of vertically polarized antennas disposed in an array, wherein two adjacent said antennas in said array are dislocated vertically relative to one another.

4. An access point configured to wirelessly communicate data symbols with user terminals in at least one of two or more different frequency channels and two or more different time slots of a frequency channel, said access point comprising:
a precoding module configured to precode said data symbols before transmitting, said precoding being dependent on information about at least one said frequency channel between said access point and said user terminals; and
a plurality of vertically polarized antennas disposed in an array, wherein two adjacent said antennas in said array are vertically dislocated relative to one another, and wherein each antenna in said array is independently connected to a transmitter.

* * * * *